United States Patent [19]

Tomabechi

[11] 4,412,638
[45] Nov. 1, 1983

[54] PINCH PRESSURE-ADJUSTING DEVICE FOR A PAIR OF PINCH ROLLERS USED WITH DUAL CAPSTAN TYPE TAPE-RUNNING APPARATUS

[75] Inventor: Hideo Tomabechi, Higashiyamato, Japan

[73] Assignee: Olympus Optical Co., Ltd., Tokyo, Japan

[21] Appl. No.: 304,950

[22] Filed: Sep. 23, 1981

[30] Foreign Application Priority Data

Sep. 30, 1980 [JP] Japan ............................. 55-139410[U]

[51] Int. Cl.³ ......................... B65H 17/20; G11B 5/54
[52] U.S. Cl. .................................... 226/190; 360/105
[58] Field of Search ............... 226/181, 183, 186, 187, 226/190, 191, 194; 360/105, 106

[56] References Cited

U.S. PATENT DOCUMENTS

| | | | |
|---|---|---|---|
| 3,093,284 | 6/1963 | Mullin | 226/191 X |
| 3,351,255 | 11/1967 | Gorawski et al. | 226/187 X |
| 3,480,230 | 11/1967 | Hosono et al. | 242/191 |
| 3,686,433 | 8/1972 | Camras | 360/105 X |
| 4,309,733 | 1/1982 | Tomabechi | 360/105 |

FOREIGN PATENT DOCUMENTS 683622  4/1964  Canada ................................ 360/105

*Primary Examiner*—Stuart S. Levy
*Assistant Examiner*—Lloyd D. Doigan

*Attorney, Agent, or Firm*—Frishauf, Holtz, Goodman and Woodward

[57] ABSTRACT

The pinch pressure-adjusting device comprises a pair of pinch roller-supporting members which rotatably hold the paired pinch rollers and whose pivotal shaft is set in parallel with the rotary shafts of said paired pinch rollers; a first urging member, one end of which is fixed to one of the paired pinch roller-supporting members; a second urging member, one end of which is fixed to the other of the paired pinch roller-supporting members; and a movable member which is fixed to the other end of the first urging member and to the other end of the second urging member. The movable member is shifted between a first position in which the movable member is more spaced from one of the paired pinch roller-supporting members than from the other thereof and a second position in which the movable member is more spaced from the other of the paired pinch roller-supporting members than from the one thereof. When the tape travels in a direction from the other of the paired pinch rollers to the one thereof, the movable member takes the first position to cause the first urging member to produce a greater urging force than the second urging member, and, when the tape travels in the opposite direction between the paired pinch rollers, the movable member takes the second position to cause the second urging member to produce a greater urging force than the first urging member.

14 Claims, 3 Drawing Figures

PINCH PRESSURE-ADJUSTING DEVICE FOR A PAIR OF PINCH ROLLERS USED WITH DUAL CAPSTAN TYPE TAPE-RUNNING APPARATUS

BACKGROUND OF THE INVENTION

This invention relates to a pinch pressure-adjusting device for adjusting the relative pinch pressure of a pair of pinch rollers used with a dual capstan type tape-running apparatus in accordance with the traveling direction of a magnetic tape.

With the conventional dual capstan type tape-running apparatus, a pair of pinch rollers are operated with the same pinch pressure when a magnetic tape runs from one capstan to the other or vice versa.

Where, under such condition, a magnetic tape clamped between a pinch roller and capstan constituting one assembly and also between a pinch roller and capstan constituting another assembly sags while running between both pinch roller-capstan assemblies, then said sagging does not disappear, until the paired pinch rollers are removed from the corresponding capstans.

Where a dual capstan type tape-running apparatus is a tape recorder exclusively applied for reproduction or applicable for both recording and reproduction, a magnetic tape is set between a pair of capstans. Where a magnetic tape sagging between a pair of capstans runs in either direction, the magnetic head does not tightly touch the magnetic tape at the time of recording or reproduction. The loose contact of the magnetic head with the magnetic tape leads to variations in the level of recording and reproduction signals or the deterioration of the high frequency characteristics of such signals.

SUMMARY OF THE INVENTION

It is accordingly the object of this invention to provide a pinch pressure-adjusting device for a pair of pinch rollers used with a dual capstan type tape-running apparatus which prevents the occurrence of tape sagging between a pair of capstans while a magnetic tape travels in either of two opposite directions.

DETAILED DESCRIPTION OF THE PREFERRED EMBODIMENT

Figure 1:
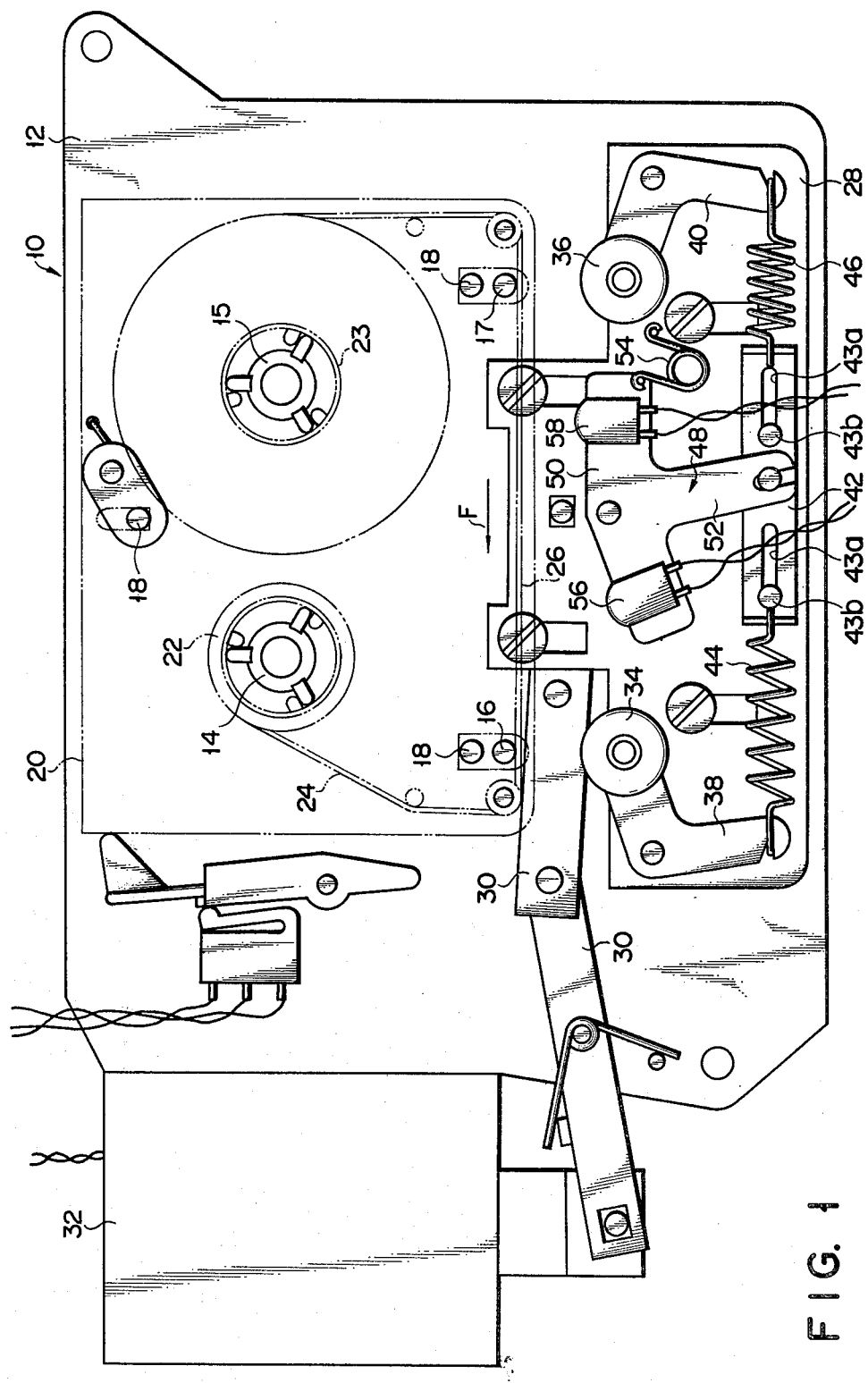
FIG. 1 is a plan view of the main part of a tape-running apparatus provided with a pinch pressure-adjusting device embodying this invention for a pair of pinch rollers, in which a first movable member takes a first position causing a pair of pinch rollers not to clamp a magnetic tape with the aid of the corresponding paired capstans.

FIG. 1 shows the main part of a tape-running apparatus 10 provided with a pinch pressure-adjusting device embodying this invention for a pair of pinch rollers. As seen from FIG. 1, the tape-running apparatus 10 (formed of a tape recorder in this embodiment) comprises a substrate 12. This substrate 12 is fitted with a pair of reel shafts 14, 15, a pair of capstans 16, 17 and a plurality of cassette position-defining pins 18 projecting substantially vertically from the front side of the substrate 12. The paired capstans 16, 17 can be simultaneousely rotated at the same speed in either way. The paired reel shafts 14, 15 are engaged, as shown in FIG. 1, with the corresponding paired reel hubs 22, 23 rotatably held in the housing 20 of a tape cassette. The paired reel hubs 22, 23 are wound with a magnetic recording tape 24. This tape 24 is received in the housing 20 together with the reel hubs 22, 23. A plurality of cassette position-defining pins 18 are detachably fitted to the housing 20 to hold it substantially in parallel with the front side of the substrate 12. The housing 20 is formed of a pair of supporting walls (not shown) which are set substantially in parallel with the front side of the substrate 12 to rotatably hold the paired reel hubs 22, 23, and a peripheral wall (not shown) connecting the paired supporting walls in parallel with each other. An elongate opening 26 for insertion of a magnetic head and pinch roller is formed in part of the peripheral wall. That portion of a tape 24 which is stretched in parallel with an imaginary line connecting the centers of the paired reel hubs 22, 23 extends along the elongate opening 26 of the housing 20.

Where the reel shafts 14, 15 are rotated clockwise of FIG. 1 at the same time, then the tape 24 travels along the opening 26 in the direction of an indicated arrow F. Conversely where the reel shafts 14, 15 are rotated counterclockwise, then the tape runs along the opening in the opposite direction.

A first movable member 28 is mounted on the substrate 12. This first movable member 28 is selectively moved along the front side of the substrate 12 between a first position indicated in FIG. 1 and a second position near the paired reel shafts 14, 15 by means of drive means comprising a plurality of connection members 30 and plunger 32. Where, with the foregoing embodiment, no power is supplied to the plunger 32, then the first movable member 28 retains the first position indicated in FIG. 1. Conversely where power is supplied to the plunger 32, then the first movable member 28 is shifted to the aforementioned second position near the paired reel shafts 14, 15 by the drive means.

A pair of pinch rollers 34, 36 are mounted on the front side (parallel with the surface of the drawing) of the first movable member 28. The pinch rollers 34, 36 are respectively rotatably fitted to one end of each of the corresponding paired L-shaped pinch roller support members 38, 40 set in parallel with the front side of the first movable member 28. The paired support members 38, 40 are fitted to the first movable member 28 in a state rotatable in parallel with the front side thereof by being pivoted at midpoint. The rotary shafts of the pinch rollers 34, 36 and those of the support members 38, 40 thereof are set in parallel with each other.

A second movable member 42 is mounted on the front side of the first movable member 28, between the paired pinch roller support members 38, 40. The second movable member 42 is provided with a pair of slits 43a, which are penetrated by a pair of pins 43b fixed to the front side of the first movable member 28. Each of the pair of slits 43a extending in the right and left directions. The second movable member 42 is shifted by being guided by the paired elongate slits 43a between a first position in which said second movable member 42 is more spaced from the left pinch roller support 38 than from the right pinch roller 40 and a second position in which said second movable member 42 is more spaced from the right pinch roller 40 than from the left pinch roller 38. The second movable member 42 arranged as described above constitutes pinch pressure-adjusting means embodying this invention.

Figure 2:
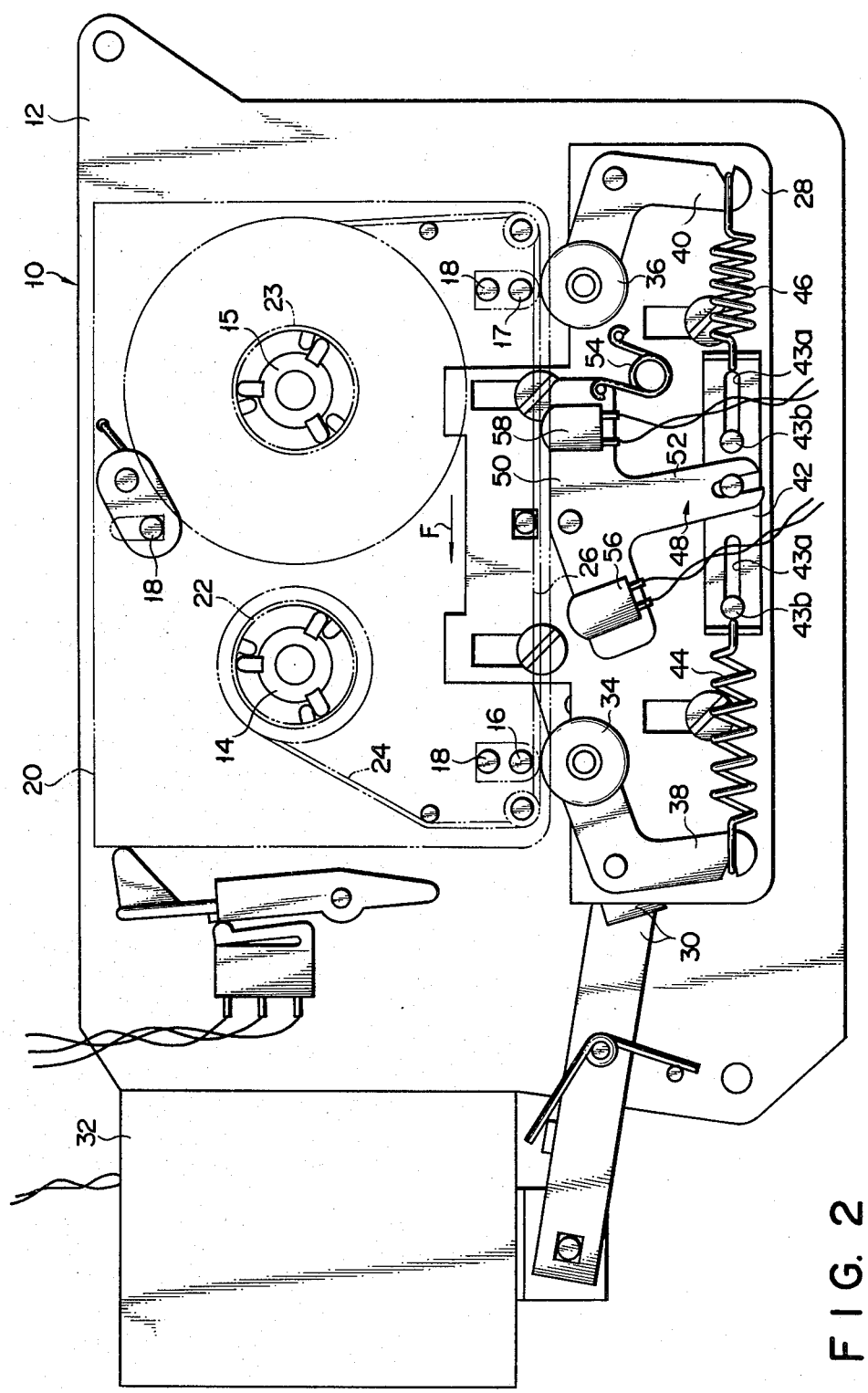
FIG. 2 is a plan view of the condition in which the first movable member of FIG. 1 takes a second position, causing the pair of pinch rollers to clamp the magnetic tape with the aid of the corresponding paired capstans, and a second movable member of FIG. 1 occupies a first position.

A first urging member 44 is connected at one end to the left pinch roller support 38 and fixed at the other end to the second movable member 42. A second urging member 46 is connected at one end to the right pinch roller support member 40 and fixed at the other end to the second movable member 42. The first and second urging members 44, 46 are formed of compression coil springs having the same elasticity coefficient.

Where the first movable member 28 takes the second position shown in FIG. 2, then the paired pinch rollers 34, 36 are inserted into the elongate opening 26 of the tape cassette housing 20 to clamp the tape 24 in cooperation with the paired capstans 16, 17. Where, in this case, the second movable member 42 is set in the first position shown in FIG. 2, then the left pinch roller 34 is pressed against the left capstan 16 with a greater urging force than that which is applied to the right pinch roller 36. In other words, the pinch pressure of the left pinch roller 34, that is, the force with which said left pinch roller 34 clamps the tape 24 in cooperation with the left capstan 16 is greater than the pinch pressure of the right pinch roller 36, that is, the force with which said right pinch roller 36 clamps the tape 24 in cooperation with the right capstan 17.

Now let is be assumed that the first movable member 28 takes the second position, and the second movable member 42 occupies the first position (FIG. 2), and the paired capstans 16, 17 are rotated at an equal speed clockwise of FIG. 2, and the paired reel shafts 14, 15 are rotated similarly clockwise of FIG. 2. Then, the tape 24 runs from the right reel hub 23 to the left reel hub 22, namely, from the right pinch roller 36 to the left pinch roller 34 in the direction of the indicated arrow F (FIG. 2). In this case, the left pinch roller 34 has a greater pinch pressure than the right pinch roller 36. In other words, the force with which the left pinch roller 34 drives the tape 24 is greater than that with which the right pinch roller 36 drives the tape 24. Consequently, the tape 24 stretched between the left pinch roller 34 and the right pinch roller 36 undergoes a certain tension, and is made to run from the right pinch roller 36 to the left pinch roller 34 at a prescribed speed without sagging. The second movable member 42 is connected to switching means (not shown) used with the magnetic tape-running apparatus 10, thereby to be selectively shifted between the previously defined first and second positions.

Figure 3:
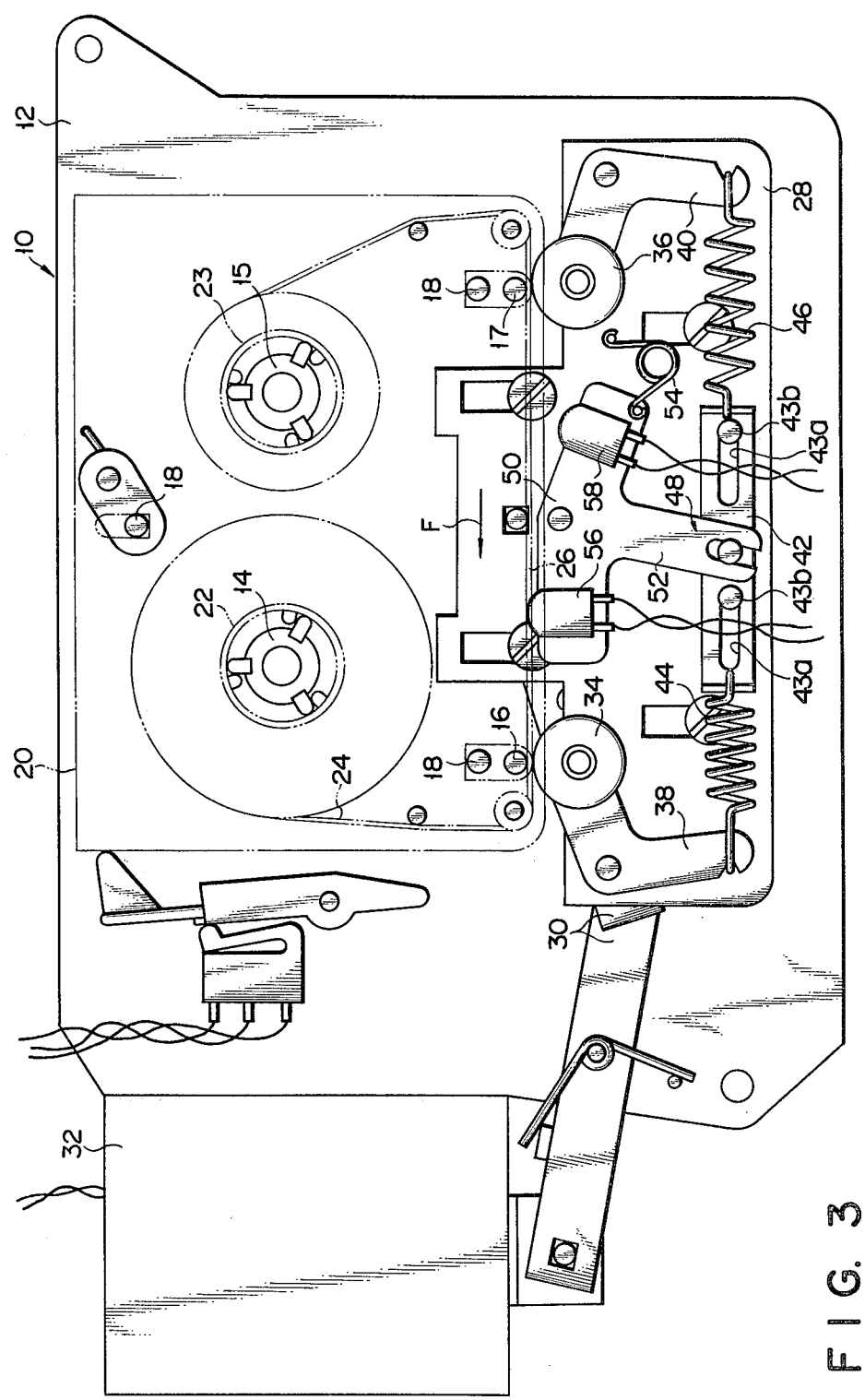
FIG. 3 is a plan view of the condition in which the first movable member of FIG. 1 is set in the second position, causing the paired pinch rollers to clamp the magnetic tape with the aid of the corresponding paired capstans, and the second movable member of FIG. 1 takes a second position.

Now let it be assumed that as shown in FIG. 3, the first movable member 28 takes the second position; the second movable member 42 is set in the second position by the action of the switch means (not shown); the paired capstans 16, 17 are rotated at an equal speed counterclockwise of FIG. 3; and the paired reel shafts 14, 15 are rotated at an equal speed similarly counterclockwise of FIG. 3. Then the tape 24 travels in a direction opposite to that of the indicated arrow F from the left reel hub 22 to the right wheel hub 23, namely, from the left pinch roller 34 to the right pinch roller 36. At this time, the right pinch roller 36 is pressed against the corresponding capstan 17 with a greater urging force than that with which the left pinch roller 34 is pressed against the corresponding capstan 16. In other words, the pinch pressure of the right pinch roller 36, that is, the force with which said right pinch roller 36 clamps the tape 24 in cooperation with the corresponding capstan 17 is greater than that of the left pinch roller 34, that is, the force with which said left pinch roller 34 clamps the tape 24 in cooperation with the corresponding capstan 16. Consequently, the tape 24 is driven by the right pinch roller 36 with a greater force than by the left pinch roller 34. As a result, the tape 24 stretched between the left pinch roller 34 to the right pinch roller 36 undergoes a certain tension and travels at a prescribed speed without sagging from the left pinch roller 34 to the right pinch roller 36.

Regardless of whether the second movable member 42 takes the first or second position, the paired capstans 16, 17 and paired reel shafts 14, 15 can be rotated when the first movable member 28 occupies the first position shown in FIG. 1 so as to moves the tape 24 at a relatively high speed.

A swingable member 48 (FIG. 1) is mounted on the front side (parallel to the surface of the drawing) of the first movable member 28. The swingable member 48 comprises an arm section 50 extending in the traveling direction of the tape 24 indicated by the arrow F and a body section 52 extending from the center of said arm section 50 in a direction intersecting the traveling direction of the tape 24 indicated by the arrow F. The swingable member 48 is mounted on the front side of the first movable member 28 in a state rotatable in parallel therewith around the center of the arm section 50. The extending end portion of the body section 52 intersects the front side of the second movable member 42 (FIG. 1). An elongate hole is formed in the end portion of the body section 52 is penetrated by a pin fixed to the front side of the second movable member 42. Where the second movable member 42 occupies the first position shown in FIG. 1, then the right end of the arm section 50 is drawn nearer to the housing opening 26 than the left end thereof, thereby causing the swingable member 48 to be inclined leftward. Where the second movable member 42 takes the second position (FIG. 3), then the left end of the arm section 50 is drawn nearer to the housing opening 26 than the right end thereof, thereby causing the swingable member 48 to be inclined rightward. With the foregoing embodiment, the right end of the arm section 50 is connected to one end of a toggle spring 54, the other end of which is fixed to the front side of the first movable member 28 (FIG. 1). Once inclined leftward or rightward, therefore, the swingable member 48 retains the leftward or rightward inclined position against any external forces, unless the second movable member 42 is shifted from the first to the second position or vice versa.

The left and right ends of the arm section 50 of the swingable member 48 are fitted with a pair of magnetic heads 56, 58. When the first movable member 28 takes the second position (FIG. 2), then only the magnetic head 58 fitted to the right end of the arm section 50 is pressed against the tape 24 inserted into the housing opening 26. Where the first movable member 28 occupies the second position shown in FIG. 3 and the second movable member 42 takes the second position indicated in FIG. 3, then only the magnetic head 56 fitted to the left end of the arm section 50 is pressed against the tape 24 inserted into the housing opening 26 as shown in FIG. 3. With the foregoing embodiment, the paired magnetic heads 56, 58 constitute a combination magnetic head selectively acting on the different tracks of the tape 24 for recording or reproduction by means of a selection switch (not shown) used with the tape-running apparatus 10.

A pinch pressure-adjusting device embodying this invention for the paired pinch rollers used with a dual capstan type tape-running apparatus comprises:

urging means fitted to the paired pinch rollers to press them against the corresponding capstans with a certain pinch pressure; and urging force-adjusting means which is mounted on the urging means, and, when the tape runs from one to the other of the pinch rollers, causes either pinch roller to be pressed against the corresponding capstan with a greater pressure than that with which the other pinch roller is pressed against the corresponding capstan.

The above-mentioned arrangement enables the tape 24 running between the paired pinch rollers to be driven with a greater pinch pressure by either of said pinch rollers than the other. Even where, therefore, sagging takes place in the tape stretched between one pinch roller-capstan assembly and another pinch roller-capstan assembly, said sagging is extinguished when the tape is driven in either way.

This invention provides a pinch pressure-adjusting device for the paired pinch rollers used with a dual capstan type tape-running apparatus, wherein the urging means comprises:

a pair of pinch roller-supporting members which rotatably support the paired pinch rollers and are respectively provided with a pivotal shaft set in parallel with that of each of the paired pinch rollers;

a first urging member, one end of which is fixed to one of the paired pinch roller-supporting members; and a second urging member, one end of which is fixed to the other of the paired pinch roller-supporting members, and wherein the urging force-adjusting means comprises a movable member which is fixed to the other end of the first urging member and the other end of the second urging member, and can be shifted between a first position in which said movable member is more spaced from one of the paired pinch roller-supporting members than from the other thereof and a second position in which said movable member is more spaced from the other of the paired pinch roller-supporting members than from said one thereof, said, when the tape travels in a given direction between the paired pinch rollers, takes a first position, thereby causing the first urging member to produce a greater urging force than the second urging member, and, when the tape travels between the paired pinch rollers in the same direction as described above, takes a second position, thereby causing the second urging member to exert a greater urging force than the first urging member. The above-mentioned arrangement simplifies the construction of the urging force-adjusting means.

With a pinch pressure-adjusting device embodying this invention for the pinch rollers used with a dual capstan type tape-running apparatus, the urging force-adjusting means may comprise a swingable member which is rotated when the movable member is shifted between the previously defined first and second positions. This swingable member is provided with a pair of magnetic heads. Where the tape travels from one of the paired pinch rollers to the other thereof, said swingable member is rotated in one direction, causing one of the paired magnetic heads to be pressed against the tape. Where the tape travels in the opposite direction, then the swingable member is rotated similarly in the opposite direction, causing the other of said paired magnetic heads to be pressed against the tape. Provision of the swingable member has the advantage of reducing the frictional damage of a magnetic head and the magnetized plane of a magnetic tape.

It will be noted that the foregoing embodiment is described simply for the explanation of this invention, and does not define limitations on the invention, and that changes and modifications falling within the technical scope of the invention are obviously taken to be included in the invention.

What is claimed is:

1. A pinch pressure-adjusting device for a pair of pinch rollers used with a bidirectional dual capstan type tape-running apparatus which is provided with first and second capstans jointly rotated in either of two opposite directions at an equal speed, and first and second pinch rollers respectively associated with said first and second capstans for clamping a tape in cooperation with the respective corresponding first and second capstans to let said tape travel in either of said two opposite directions, said pinch rollers being mounted on respective rotary shafts, the pinch pressure-adjusting device comprising:

urging means mounted on said first and second pinch rollers to urge them to be pressed against their corresponding respective first and second capstans; and urging force-adjusting means mounted on said urging means such that when the tape travels in a direction from said first pinch roller to said second pinch roller the urging means causes said second pinch roller to be urged toward its respective capstan with a greater force than said first pinch roller, whereby said second pinch roller applies greater pinch pressure to the tape than said first pinch roller, and said urging force adjusting means causing, when the tape travels in a direction from said second pinch roller to said first pinch roller, said first pinch roller to be urged toward its respective capstan with a greater force than said second pinch roller whereby said first pinch roller applies a greater pinch pressure to the tape than said second pinch roller;

said urging means comprising:

first and second pinch roller-supporting members which rotatably hold said first and second pinch rollers respectively, each pinch roller-supporting member having a pivotal shaft which is in parallel with said rotary shafts of said pinch rollers;

a first urging member having two ends, one end of which is fixed to said first pinch roller-supporting member which rotatably holds said first pinch roller; and a second urging member having two ends, one end of which is fixed to said second pinch roller-supporting member which rotatably holds said second pinch roller; and said urging force-adjusting means comprising a movable member which is connected to another end of said first urging member and to another end of said second urging member, said movable member being shiftable between a first position in which said movable member is more spaced from said first pinch roller-supporting member than from said second pinch roller-supporting member and a second position in which said movable member is more spaced from said second pinch roller-supporting member than from said first pinch roller-supporting member, and when the tape travels from said second pinch roller to said first pinch roller, said movable member takes said first position to cause said first urging member to produce a greater urging force than said second urging member, and, when the tape travels from said first pinch roller to said second pinch roller, said movable member takes said second position to cause said second urging member to produce a greater urging force than said first urging member.

2. The pinch pressure-adjusting device of claim 1, wherein said urging force-adjusting means further comprises a swingable member which is connected to said movable member and swings when said movable member is shifted between its said first and second positions; said swingable member being provided with first and second magnetic heads; and, when the tape travels from said first pinch roller to said second pinch roller, said swingable member is swingably rotated in one direction causing said first magnetic head to be pressed against the tape, and, when the tape travels from said second pinch roller to said first pinch roller, said swingable member is swingably rotated in a direction opposite to said one direction, causing said second magnetic head to be pressed against the tape.

3. The pinch pressure-adjusting device of claim 2, wherein said urging force-adjusting means further comprises a toggle spring coupled to said swingable member for selectively urging said swingable member in said one or said opposite direction to selectively hold said movable member at said first or second position thereof.

4. The pinch pressure-adjusting device of claim 2, wherein said first and second pinch roller-supporting members comprise respective generally L-shaped members pivotally mounted at respective intermediate portions thereof, said generally L-shaped members carrying respective pinch rollers at first ends thereof and being connected to said respective first and second urging members at respective other ends thereof.

5. The pinch pressure-adjusting device of claim 4, wherein said urging force-adjusting means further comprises a toggle spring coupled to said swingable member for selectively urging said swingable member in said one or said opposite direction to selectively hold said movable member at said first or second position thereof.

6. The pinch pressure-adjusting device of claim 1, wherein said urging force-adjusting means further comprises toggle spring means coupled to said movable member for selectively holding said movable member at said first or second position thereof.

7. The pinch pressure-adjusting device of claim 1, wherein said first and second pinch roller-supporting members comprise respective generally L-shaped members pivotally mounted at respective intermediate portions thereof, said generally L-shaped members carrying respective pinch rollers at first ends thereof and being connected to said respective first and second urging members at respective other ends thereof.

8. The pinch-pressure-adjusting device of claim 1, wherein when said movable member is in said first position, it causes said first urging member to urge said first pinch roller-supporting member to pivot about its pivotal shaft with a stronger urging force than said second urging member applies to said second pinch roller-supporting member to cause said second pinch roller-supporting member to pivot about its pivotal shaft, thereby producing a higher pressing force of said first pinch roller against its respective capstan than said second pinch roller against its respective capstan; and when said movable member is in said second position, it causes said second urging member to urge said second pinch roller-supporting member to pivot about its pivotal shaft with a stronger urging force than said first urging member applies to said first pinch roller-supporting member to cause said first pinch roller-supporting member to pivot about its pivotal shaft, thereby producing a higher pressing force of said second pinch roller against its respective capstan than said first pinch roller against its respective capstan.

9. The pinch pressure-adjusting device of claim 8, wherein said first and second urging members comprise respective spring members.

10. The pinch pressure-adjusting device of claim 9, wherein said spring members are respective elongated coil springs which apply their respective urging forces in tension.

11. The pinch pressure-adjusting device of claim 9, wherein said first and second pinch roller-supporting members comprise respective generally L-shaped members pivotally mounted at respective intermediate portions thereof, said generally L-shaped members carrying respective pinch rollers at first ends thereof and being connected to said respective first and second urging members at respective other ends thereof.

12. The pinch pressure-adjusting device of claim 8, wherein said urging force-adjusting means further comprises a swingable member which is connected to said movable member and swings when said movable member is shifted between its said first and second position; said swingable member being provided with first and second magnetic heads; and, when the tape travels from said first pinch roller to said second pinch roller, said swingable member is swingably rotated in one direction causing said first magnetic head to be pressed against the tape, and, when the tape travels from said second pinch roller to said first pinch roller, said swingable member is swingably rotated in a direction opposite to said one direction, causing said second magnetic head to be pressed against the tape.

13. The pinch pressure-adjusting device of claim 12, wherein said first and second urging members comprise respective spring members.

14. The pinch pressure-adjusting device of claim 13, wherein said first and second pinch roller-supporting members comprise respective generally L-shaped members pivotally mounted at respective intermediate portions thereof, said generally L-shaped members carrying respective pinch rollers at first ends thereof and being connected to said respective first and second urging members at respective other ends thereof.

* * * * *